(12) United States Patent
Morita et al.

(10) Patent No.: US 6,352,085 B1
(45) Date of Patent: Mar. 5, 2002

(54) PRESSURE RELIEF VALVE

(75) Inventors: Shoji Morita; Hideaki Ohnishi, both of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/430,748

(22) Filed: Oct. 29, 1999

(30) Foreign Application Priority Data

Aug. 4, 1999 (JP) .......................................... 11-221411

(51) Int. Cl.$^7$ .......................... F16K 15/02; F16K 17/04
(52) U.S. Cl. .................... 137/516.27; 137/538; 417/310
(58) Field of Search .............................. 137/512.1, 497, 137/538, 516.29, 516.27; 417/310, 308, 307

(56) References Cited

U.S. PATENT DOCUMENTS

| | | | | |
|---|---|---|---|---|
| 1,150,743 A | * | 8/1915 | Butts ..................... | 137/516.29 |
| 2,174,869 A | * | 10/1939 | Czarnecki ............... | 417/310 X |
| 2,305,519 A | * | 12/1942 | Dunmire ................. | 137/538 |
| 2,782,718 A | * | 2/1957 | Pettibone ............... | 417/300 X |
| 3,120,244 A | * | 2/1964 | Hahn ..................... | 137/512.5 |
| 3,338,263 A | * | 8/1967 | Altmeppen et al. ...... | 137/493.7 |
| 4,161,189 A | * | 7/1979 | Mueller, Jr. ............ | 137/538 |
| 4,161,996 A | * | 7/1979 | Dolejsi .................. | 137/514.3 |

FOREIGN PATENT DOCUMENTS

| | | |
|---|---|---|
| DE | 1116957 | 11/1961 |
| DE | 197 17 922 | 10/1998 |
| JP | 63-19088 | 2/1988 |

* cited by examiner

*Primary Examiner*—John Rivell
(74) *Attorney, Agent, or Firm*—Foley & Lardner

(57) ABSTRACT

A pressure relief valve for an oil pump of an automotive internal combustion engine. The pressure relief valve comprises a wall defining thereinside a valve accommodating bore. The wall is formed with a plurality of pressure relief holes including first and second pressure relief holes through which oil in the valve accommodating bore is releasable to an outside of the valve accommodating bore. A valve body is provided to be slidably movable in the valve accommodating bore and along the wall under balance between oil pressure acting on the valve body in a first direction and biasing force of a spring acting on the valve body in a second direction opposite to the first direction. In this arrangement, the second pressure relief hole is opened after the first pressure relief hole is opened to have a maximum cross-sectional opening area in a process of movement of the valve body in the first direction along the axis of the valve accommodating bore.

19 Claims, 8 Drawing Sheets

PRESSURE RELIEF VALVE

BACKGROUND OF THE INVENTION

1. Field of the Invention

This invention relates to improvements in a pressure relief valve adapted to release a part of the oil discharged from an oil pump of an internal combustion engine or the like.

2. Description of the Prior Art

A variety of pressure relief valves have been proposed and put into practical use for the purpose of releasing a part of oil discharged from an oil pump or the like. One of them is disclosed in Japanese Utility Model Provisional Publication No. 63-19088, in which the pressure relief valve includes a valve body or spool valve element which is slidably movable within a valve accommodating bore in accordance with balance established between the oil pressure of an oil pump and the biasing force of a spring, so as to accomplish an opening-and-closing control for first and second pressure relief holes or ports opened to the valve accommodating bore. The cross-sectional opening area of the first pressure relief hole is larger than that of the second pressure relief hole.

With such a pressure relief valve, the pressure relief holes are opened upon movement of the valve body in the valve accommodating bore thereby to allow excessive oil to be released through the pressure relief holes. At this time, as the oil pressure of the oil pump is increasing so as to move (displace) the valve body, first the first pressure relief hole having the larger cross-sectional opening area is opened. Then, the second pressure relief hole having the smaller cross-sectional area is opened in a process wherein the first relief hole is effectively increased in cross-sectional opening area.

Thus, in the above conventional pressure relief valve, the cross-sectional opening area of the first pressure relief hole is larger than that of the late opened second pressure relief hole. Besides, the second pressure relief hole is opened in the process of the first pressure relief hole increasing in cross-sectional opening area. As a result, an oil pressure characteristics C3 as indicated by a solid line in FIG. 10 is obtained under the action of the thus arranged pressure relief valve. In this oil pressure characteristics, at a point a in FIG. 10, the first pressure relief hole is opened so as to slightly reduce an increasing rate of oil pressure. At a point b in the process, the first pressure relief hole is effectively increased in cross-sectional opening area as the second pressure relief hole is opened to further reduce the increasing rate of oil pressure, so that the oil pressure is regulated to a generally constant level.

However, the thus obtained oil pressure characteristics indicated by the solid line in FIG. 10 is considerably higher than the required or ideal oil pressure characteristics indicated by a dotted line R in FIG. 10. As a result, pressure corresponding to an oblique-lined part between the solid and dotted lines causes excessive energy to be used in driving the oil pump.

SUMMARY OF THE INVENTION

It is an object of the present invention to provide an improved pressure relief valve which can effectively overcome drawbacks encountered in conventional pressure relief valves.

Another object of the present invention is to provide an improved pressure relief valve which can readily provide an oil pressure characteristics of a mechanism which requires pressurized oil, generally corresponding to a required oil pressure characteristics.

A further object of the present invention is to provide an improved pressure relief valve for an pump of an automotive internal combustion engine, which can readily provide an oil pressure characteristics of the pump, generally corresponding to a required oil pressure characteristics for the engine.

An aspect of the present invention resides in a pressure relief valve comprising a wall defining thereinside a valve accommodating bore. The wall is formed with a plurality of pressure relief holes through which oil in the valve accommodating bore is releasable to an outside of the wall. A valve body is provided to be slidably movable in the valve accommodating bore and along the wall under balance between oil pressure acting on the valve body in a first direction and biasing force of a spring acting on the valve body in a second direction opposite to the first direction. In this arrangement, after at least one of the pressure relief holes is opened to have a maximum cross-sectional opening area, remaining pressure relief holes are successively opened in a process of movement of the valve body in the first direction along an axis of the valve accommodating bore.

Another aspect of the present invention resides in a pressure relief valve comprising a wall defining thereinside a valve accommodating bore. The wall is formed with a plurality of pressure relief holes including first and second pressure relief holes through which oil in the valve accommodating bore is releasable to an outside of the valve accommodating bore. A valve body is provided to be slidably movable in the valve accommodating bore and along the wall under balance between oil pressure acting on the valve body in a first direction and biasing force of a spring acting on the valve body in a second direction opposite to the first direction. In this arrangement, the second pressure relief hole is opened after the first pressure relief hole is opened to have a maximum cross-sectional opening area in a process of movement of the valve body in the first direction along the axis of the valve accommodating bore.

A further aspect of the present invention resides in a pressure relief valve comprising a wall defining thereinside a valve accommodating bore. The wall is formed a slit-shaped pressure relief hole through which oil in the valve accommodating bore is releasable to an outside of the valve accommodating bore. The pressure relief hole is formed elongate in a direction along an axis of the valve accommodating bore. A valve body is provided to be slidably movable in the valve accommodating bore and along the wall under balance between oil pressure acting on the valve body in a first direction and biasing force of a spring acting on the valve body in a second direction opposite to the first direction. In this arrangement, the pressure relief hole is shaped such that its cross-sectional opening area linearly changes in a process of movement of the valve body in the first direction along the axis of the valve accommodating bore.

A further aspect of the present invention resides in a pressure relief valve for a pump driven by an internal combustion engine. The pressure relief valve comprises a wall defining thereinside a valve accommodating bore. The wall is formed with a plurality of pressure relief holes through which oil in the valve accommodating bore is releasable to an outside of the valve accommodating bore. A valve body is provided to be slidably movable in the valve accommodating bore and along the wall under balance between oil pressure acting on the valve body in a first direction and biasing force of a spring acting on the valve body in a second direction opposite to the first direction. In this arrangement, after at least one of the pressure relief holes is opened to have a maximum cross-sectional opening area in a low and medium engine speed operating range of the engine, remaining pressure relief holes are successively opened in a process of movement of the valve body in the first direction along the axis of the valve accommodating bore.

Accordingly, the pressure relief valve of the present invention can readily provide an oil pressure characteristics similar and generally corresponding to a required or ideal oil pressure characteristics for a mechanism requiring pressurized oil, for example, an internal combustion engine. As a result, the engine and an oil pump can be prevented from being forced to make excessive work.

BRIEF DESCRIPTION OF THE DRAWINGS

In the drawings, like reference numerals and characters designate like parts and elements throughout all figures, in which.

DETAILED DESCRIPTION OF THE INVENTION

Figure 1:
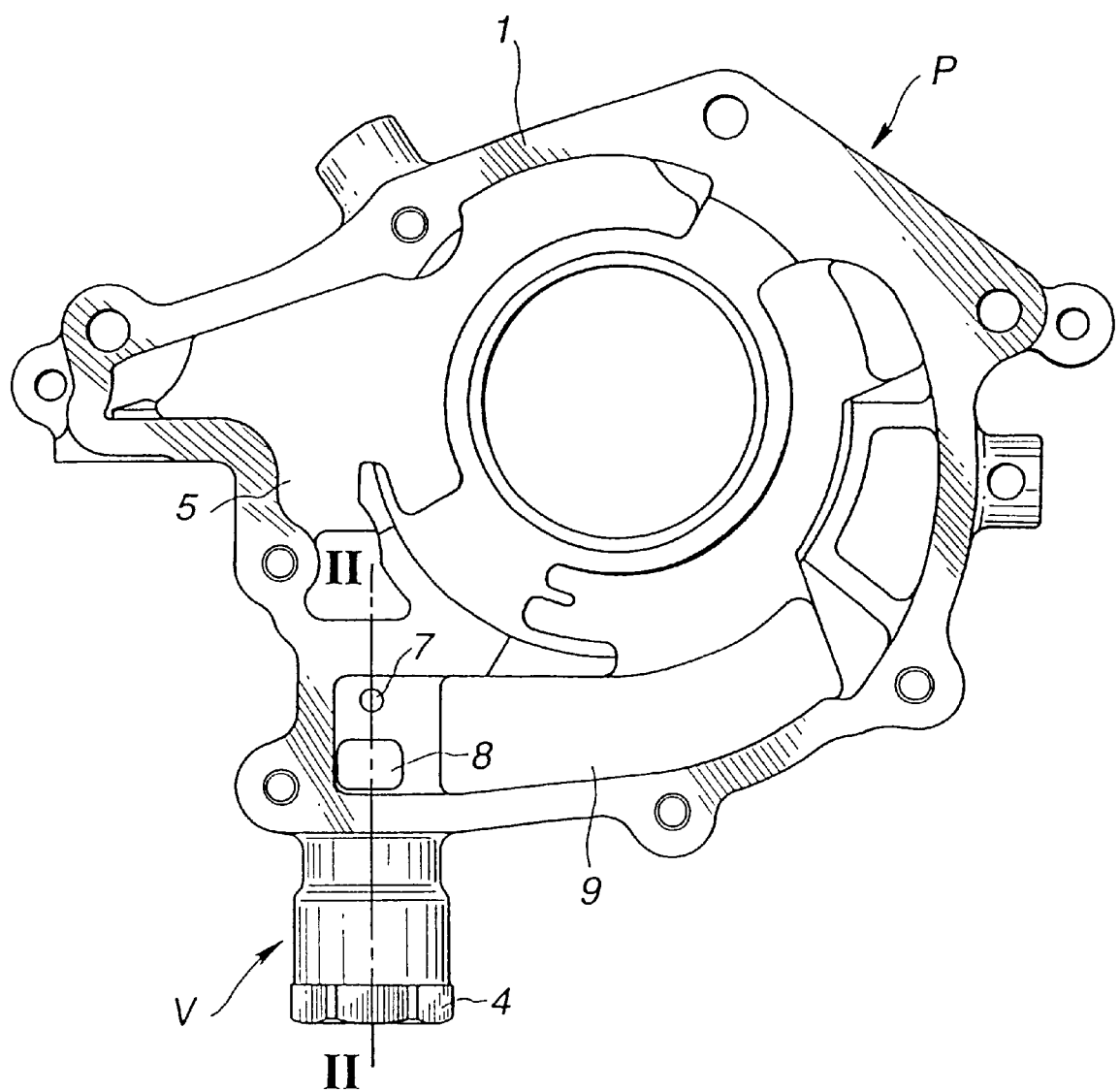
FIG. 1 is a plan view of a pump housing of an oil pump provided with an embodiment of a pressure relief valve according to the present invention.
Figure 2:
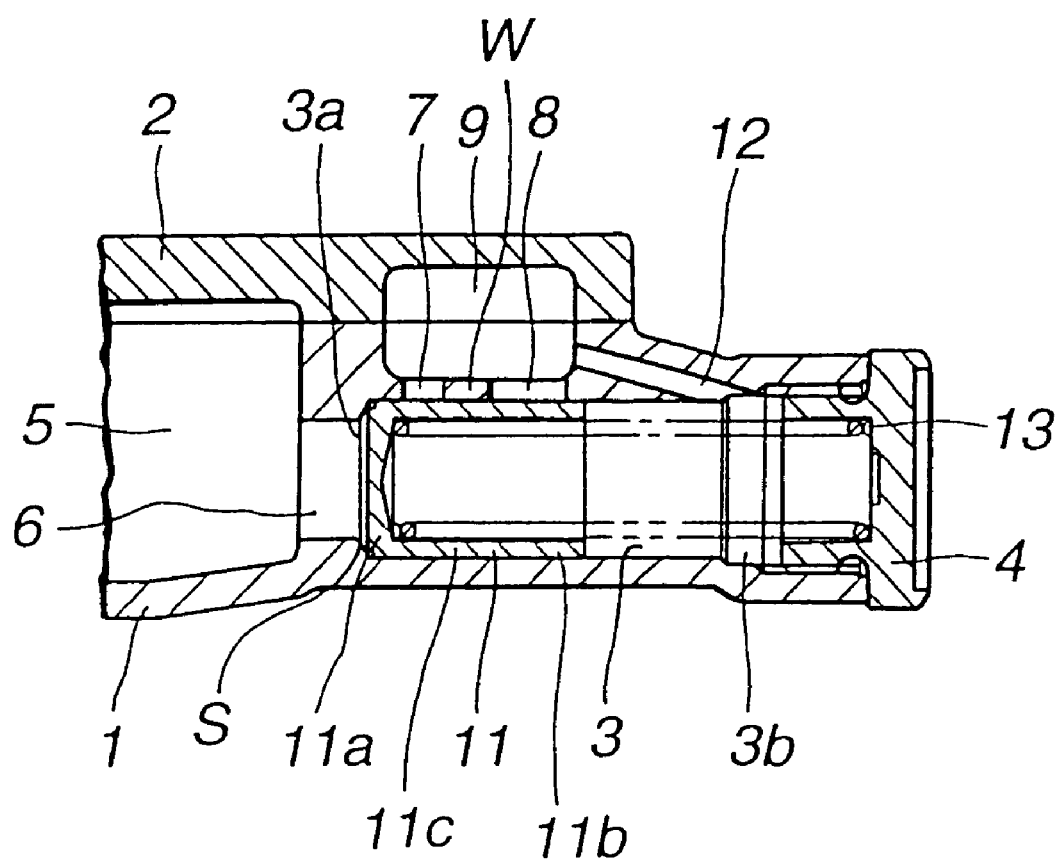
FIG. 2 is a fragmentary sectional view of an essential part of the oil pump, taken in the direction of arrows substantially along the line II—II of FIG. 1, showing the pressure relief valve of FIG. 1.

Referring now to FIGS. 1 and 2, an embodiment of a pressure relief valve V according to the present invention is shown to be incorporated in an oil pump P. In this instance, the oil pump is for supplying lubricating oil to a variety of parts of an internal combustion engine of an automotive vehicle (not shown). The oil pump P includes a pump housing 1 in which pump elements (not shown) such as a rotor or gears are rotatably disposed. The pump housing 1 is fixedly covered with a pump cover 2 so as to form a close-fitting housing. The pump housing 1 has a generally cylindrical section projecting from a main section (not identified) of the pump housing 1. The cylindrical section is formed thereinside with a valve accommodating bore 3. The cylindrical section has a rear open end (not identified) which is closed with a plug 4 which is screwed in the bore 3. An oil passage 6 is formed to connect the bore 3 to an oil discharge chamber 5 located downstream of the pump elements relative to flow of oil. The oil passage 6 is formed coaxially with the valve accommodating bore 3 and located to connect with a front end (opposite to the rear open end of the cylindrical section) of the valve accommodating bore 3. The oil passage 6 has a diameter slightly smaller than that of the valve accommodating bore 3. Pressurized oil in the oil discharge chamber 5 is introduced through the oil passage 6 into the valve accommodating bore 3.

First and second pressure relief holes 7, 8 are formed in a wall W which defines thereinside the valve accommodating bore 3 and defines thereoutside an oil suction passage 9 located upstream of the pump elements. The valve accommodating bore 3 is in communication with the oil suction passage 9 through the first and second pressure relief holes 7, 8. The first and second pressure relief holes 7, 8 are located side by side in the axial direction of the valve accommodating bore 3, in which the first pressure relief hole 7 is positioned closer to the oil passage 6 than the second pressure relief hole 8. The first and second pressure relief holes 7, 8 are formed separate from each other. The first pressure relief hole 7 of the circular cross-sectional shape has a cross-sectional opening area smaller than that of the second pressure relief hole 8 of the rectangular cross-sectional shape as shown in FIG. 1. The first and second pressure relief holes 7, 8 may have the same cross-sectional opening area. The cross-sectional opening area is a cross-sectional area on a plane perpendicular to the axis of the valve accommodating bore 3.

A generally cylindrical valve body or spool 11 is slidably disposed in the valve accommodating bore 3. The cylindrical valve body 11 is closed at its front end 11a with an end wall (not identified) which faces the oil passage 6. The rear end 11b of the valve body 11 is opened and faces the plug 4, so that the valve body 11 is formed generally cup-shaped. Thus, the valve body 11 divides the inside of the valve accommodating bore 3 into an oil passage-side variable volume chamber 3a and a plug-side chamber 3b. The inside of the cup-shaped valve body 11 forms part of the plug-side chamber 3b. The plug-side chamber 3b is in communication with the oil suction passage 9 through a passage 12 which is formed oblique relative to the valve accommodating bore 3, for the purpose of compensating a volume change of the plug-side chamber 3b with movement of the valve body 11.

The valve body 11 is always biased in the direction of the oil passage 6 by an pressure relief spring 13 which is disposed between the end wall of the valve body 11 and the plug 4. Accordingly, when oil pressure applied through the oil passage 6 is low, the front end 11a of the valve body 11 is brought into contact with an annular valve seat section S, so that both the first and second pressure relief holes 7, 8 are closed with the cylindrical wall section 11c of the valve body 11 as shown in FIG. 2.

The operation of the thus arranged pressure relief valve V will be discussed.

When oil discharged from the oil discharge chamber 5 is introduced through the oil passage 6 into the valve accommodating bore 3, the valve body 11 slidingly moves in the valve accommodating bore 3 along the wall W under balance between the pressure of oil and the biasing force of the pressure relief spring 13 thereby accomplishing an opening-and-closing control of the first and second pressure relief holes 7, 8. When the first and second pressure relief holes 7, 8 are opened upon movement of the valve body 11 in the valve accommodating bore 3, a part of the oil discharged from the oil discharge chamber 5 of the oil pump P is released as an excessive oil through the first and second pressure relief holes 7, 8 toward the oil Suction passage 9.

Figure 3A:
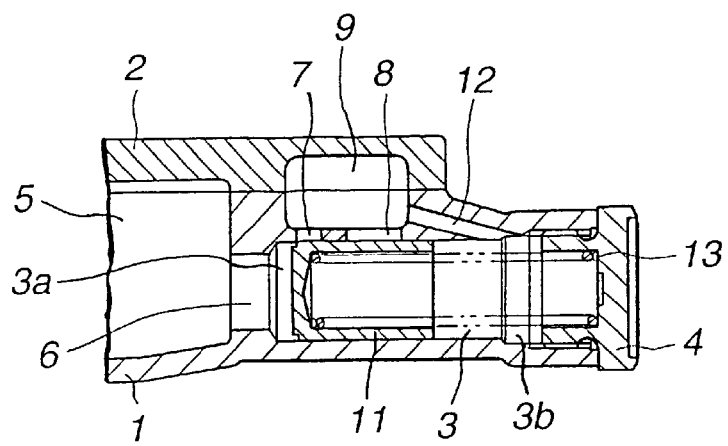
FIG. 3A is a fragmentary sectional view similar to FIG. 2 but showing a first operational mode of the pressure relief valve of FIG. 1.
Figure 3B:
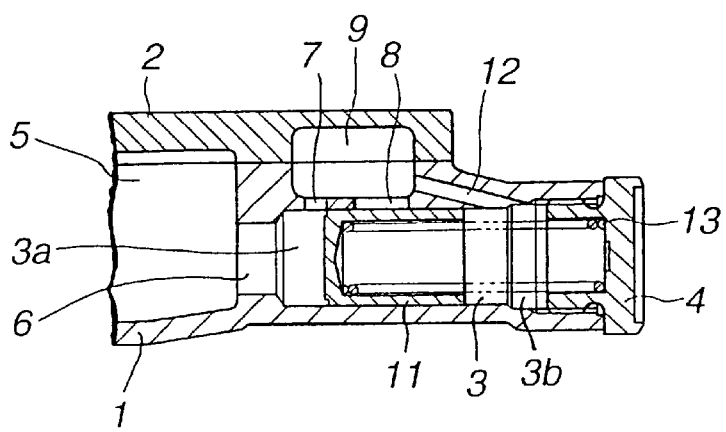
FIG. 3B is a fragmentary sectional view similar to FIG. 2 but showing a second operational mode of the pressure relief valve of FIG. 1, succeeding to the first operational mode.
Figure 3C:
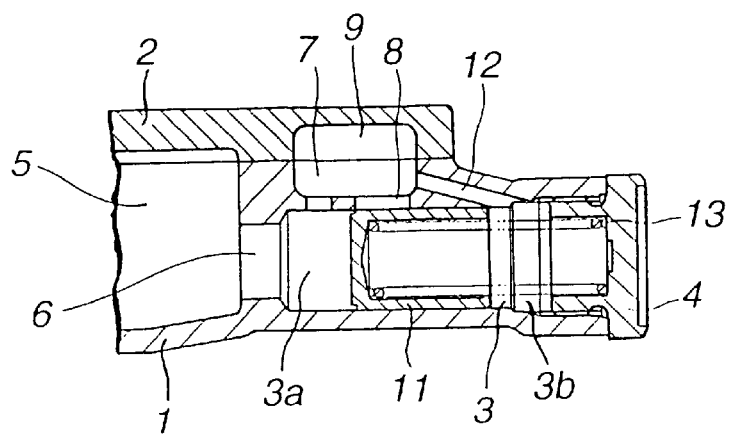
FIG. 3C is a fragmentary sectional view similar to FIG. 2 but showing a third operational mode of the pressure relief valve of FIG. 1, succeeding to the second operational mode.

At this time, first the pressure relief hole 7 begins to be opened upon movement of the valve body 11 as shown in FIG. 3A. Then, after the first pressure relief hole 7 has been opened maximally as shown in FIG. 3B, the second pressure relief hole 8 begins to be opened as shown in FIG. 3C. As a result, an oil pressure characteristics as indicated by a solid line C1 in FIG. 4 can be obtained.

Figure 4:
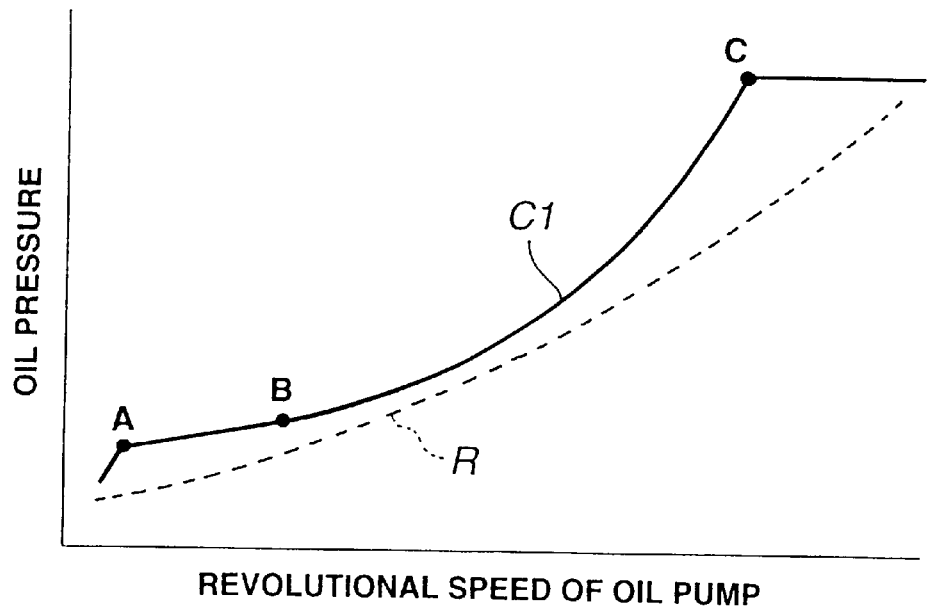
FIG. 4 is a graph showing an oil pressure characteristics of the oil pump provided with the pressure relief valve of FIG. 1, in terms of oil pressure and revolutional speed of the oil pump.

The oil pressure characteristics of FIG. 4 will be discussed. In FIG. 4, the oil pressure characteristics is represented in terms of oil pressure produced by the oil pump P and revolutional speed of the oil pump P. At a point A in FIG. 4, the first pressure relief hole 7 begins to be opened so as to slightly reduce the increasing oil pressure of the oil pump. At a point B, the first pressure relief hole 7 is maximally opened. Then, this first pressure relief hole 7 functions as a so-called fixed orifice because the cross-sectional opening area of the first pressure relief hole 7 which has been already opened to the maximum and cannot be changed even though the discharge amount of the oil pump B gradually increases. Accordingly, from the point B, the oil pressure is gradually increases. Thereafter, when oil pressure reaches a certain level, the second pressure relief hole 8 is opened at a point C in FIG. 4 thereby to reduce the increasing oil pressure, so that the oil pressure is suppressed to a generally constant level.

Here, in case that the oil pump P is driven by the internal combustion engine, the oil pressure characteristics indicated by the solid line in FIG. 4 cannot be obtained if the cross-sectional opening area of the first pressure relief hole 7 has not reached its maximum level in low and medium engine speed operating ranges of the engine. Accordingly, the cross-sectional opening area of the first pressure relief hole 7 is smaller than that of the second pressure relief hole 8 through which a large amount of oil is released in a high engine speed operating range of the engine.

Thus, according to the above embodiment, the pressure relief valve V can provide the oil pressure characteristics which are similar to the required or ideal oil pressure characteristics (indicated by a dotted line R in FIG. 4) for the engine. Accordingly, the engine and the oil pump can be prevented from consuming unnecessary amounts of energy. Consequently, by virtue of the pressure relief valve V of the embodiment, the oil pressure characteristics of the oil pump P generally corresponding to the required oil pressure characteristics can be readily obtained for the oil pump P.

Additionally, the cross-sectional opening area of the first pressure relief hole 7 which is opened first, is smaller than that of the second pressure relief hole S which is opened later. Therefore, the early opened first pressure relief hole 7 can be maximally opened later in the engine operating ranges where the oil pressure of the oil pump is relatively low. This can readily cause the oil pressure characteristics of the oil pump P to approach the required oil pressure characteristics.

It will be understood that the cross-sectional opening areas of the first and second pressure relief holes 7, 8 may be the same, which facilitates machining of the pressure relief holes 7, 8.

Figure 5:
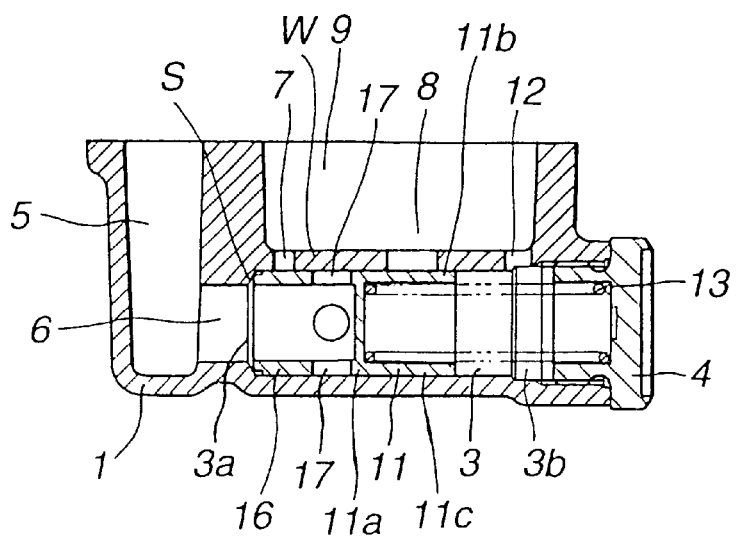
FIG. 5 is a sectional view similar to FIG. 2 but showing an essential part of an oil pump provided with another embodiment of the pressure relief valve according to the present invention.

FIGS. 5 and 6 illustrate another embodiment of the pressure relief valve V according to the present invention, which is similar to the embodiment of FIGS. 1 to 4 with the exception that a guide support section 16 is formed at the front end section 11a of the valve body 11 for the purpose of effectively guiding the movement of the valve body 11.

Specifically, the cylindrical guide support section 16 is formed integral with the front end 11a of the valve body 11. The guide support section 16 is coaxial with the cylindrical valve body 11 and has a diameter which is generally the same as that of the valve body 11. The free end (front end) of the guide support section 16 is opened, so that oil from the oil discharge chamber 5 can be introduced through the oil passage 6 into the inside of the guide support section 16. The cylindrical wall of the guide support section 16 is formed with four communication holes 17 which can be brought into communication with the second pressure relief hole 8. The four communication holes 17 are arranged in a peripheral direction of the guide support section 16. The communication holes 17 are formed through the cylindrical wall of the guide support section 16, so that oil introduced inside the guide support section 16 can be released to the oil suction passage 9 through the communication holes 17 and the second pressure relief hole 8. Each communication hole 17 has the generally same cross-sectional opening area as that of the second pressure relief hole 8.

The valve body 11 is always biased toward the oil passage 6 under the biasing force of the pressure relief spring 13 seated on the plug 4. Accordingly, when the oil pressure of oil introduced from the oil passage 6 is low, the guide support section 16 formed at the front end 11a of the valve body 11 is closing the first pressure relief hole 7 while the cylindrical wall 11 c of the valve body 11 is closing the second pressure relief hole 8, as shown in FIG. 5.

With the thus arranged pressure relief valve V, when oil discharged from the oil discharge chamber 5 is introduced through the oil passage 6 into the valve accommodating bore 3, the valve body 11 slidingly moves in the valve accommodating bore 3 along the wall W under balance between the pressure of oil and the biasing force of the pressure relief spring 13 thereby accomplishing an opening-and-closing control of the first and second pressure relief holes 7, 8. When the first and second pressure relief holes 7, 8 are opened upon movement of the valve body 11 in the valve accommodating bore 3, a part of oil discharged from the oil discharge chamber 5 of the oil pump P is released as an excessive oil through the first and second pressure relief holes 7, 8 toward the oil suction passage 9.

Figure 6A:
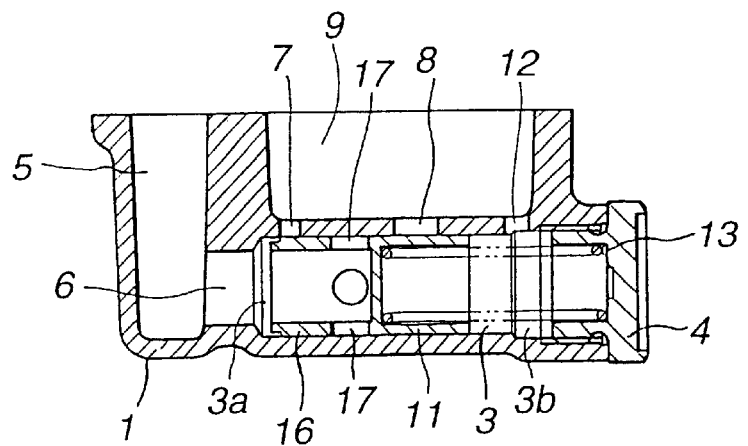
FIG. 6A is a fragmentary sectional view similar to FIG. 5 but showing a first operational mode of the pressure relief valve of FIG. 5.
Figure 6B:
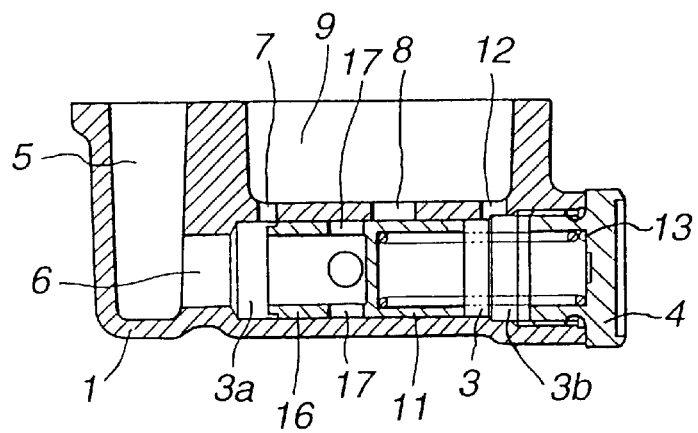
FIG. 6B is a fragmentary sectional view similar to FIG. 5 but showing a second operational mode of the pressure relief valve of FIG. 5, succeeding to the first operational mode.
Figure 6C:
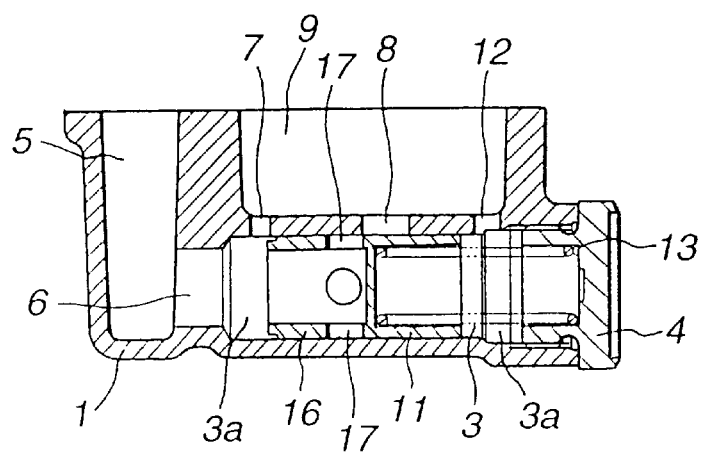
FIG. 6C is a fragmentary sectional view similar to FIG. 5 but showing a third operational mode of the pressure relief valve of FIG. 5, succeeding to the second operational mode.

At this time, first the first pressure relief hole 7 begins to be opened upon movement of the valve body 11 as shown in FIG. 6A. Then, after the first pressure relief hole 7 has been opened to have its maximum cross-sectional opening area as shown in FIG. 6B, the communication hole 17 comes into communication with the second pressure, relief hole 8 so that the second pressure relief hole 8 begins to be opened as shown in FIG. 6C.

As a result of such a manner for opening the first and second pressure relief holes 7, 8, an oil pressure characteristics as indicated by the solid line C1 in FIG. 4 can be obtained like in the pressure relief valve V of the embodiment of FIGS. 1 to 4. Thus, the pressure relief valve V of this embodiment can provide the oil pressure characteristics which is similar to the required or ideal oil pressure characteristics for the engine.

Additionally, by virtue of the guide support section 16 formed with the communication hole 17 which is communicable with the second pressure relief hole 8, the valve body 11 can smoothly slidably move under a guiding and supporting action of the guide and support section 16 even if the valve body 11 is subjected to a biasing due to flow of oil released through the pressure relief holes 7, 8, particularly due to flow of high pressure oil released through the communication hole 17 and the second pressure relief hole 8.

Figure 7:
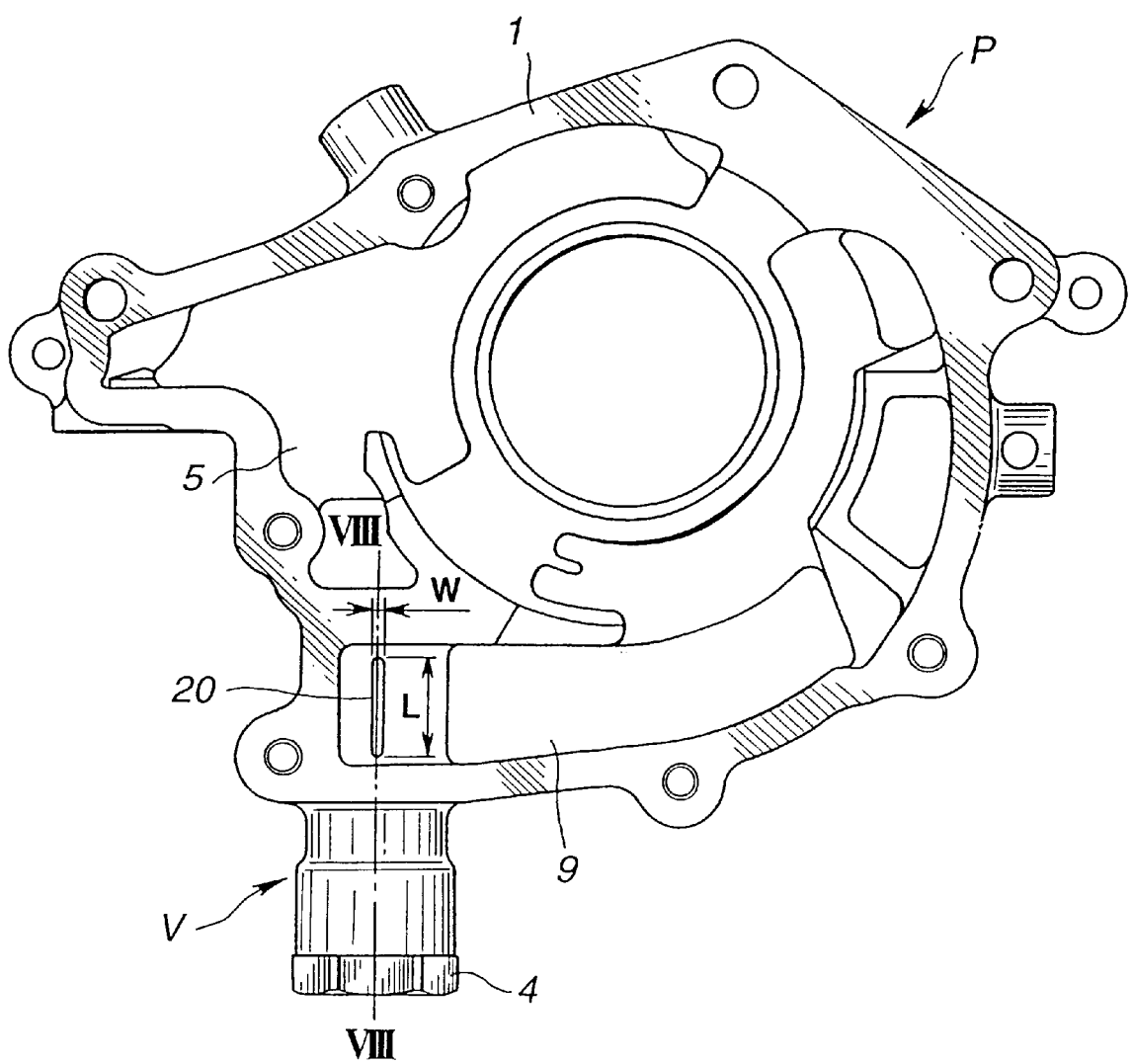
FIG. 7 is a plan view similar to FIG. 1 but showing a pump housing of an oil pump provided with a further embodiment of the pressure relief valve according to the present invention.
Figure 8:
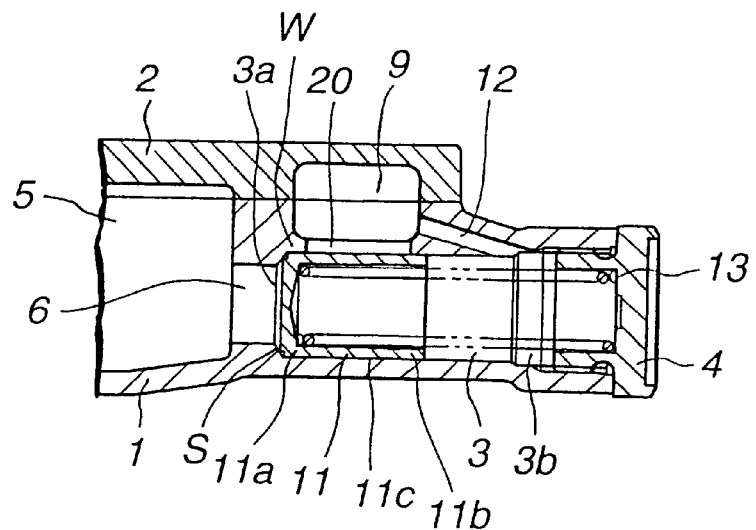
FIG. 8 is a fragmentary sectional view similar to FIG. 2 but showing an essential part of the oil pump, taken in the direction of arrows substantially along the line VIII—VIII of FIG. 7, illustrating the pressure relief valve of FIG. 7.
Figure 9:
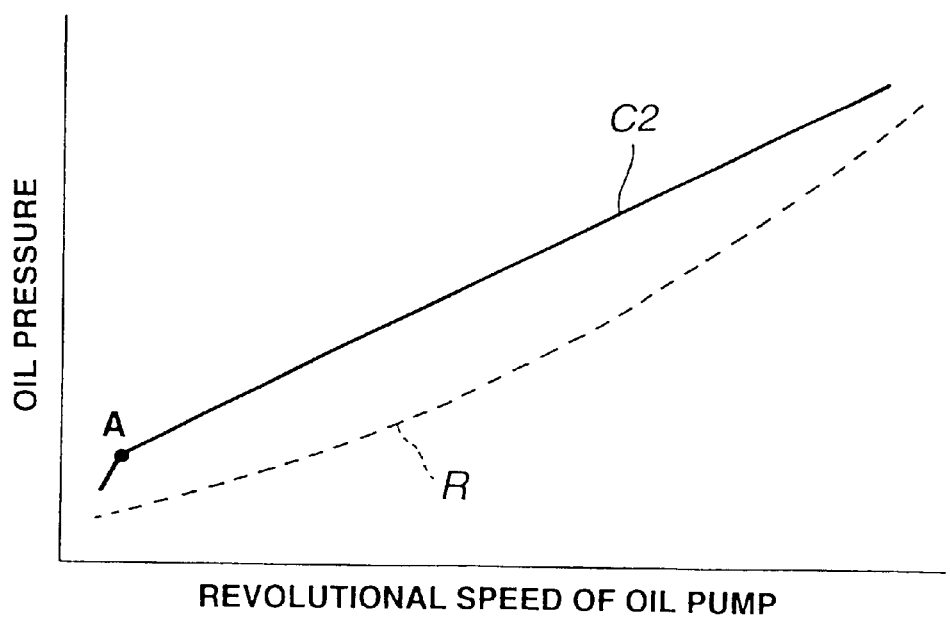
FIG. 9 is a graph similar to FIG. 4 but showing an oil pressure characteristics of the oil pump provided with the pressure relief valve of FIG. 8, in terms of oil pressure and revolutional speed of the oil pump.
Figure 10:
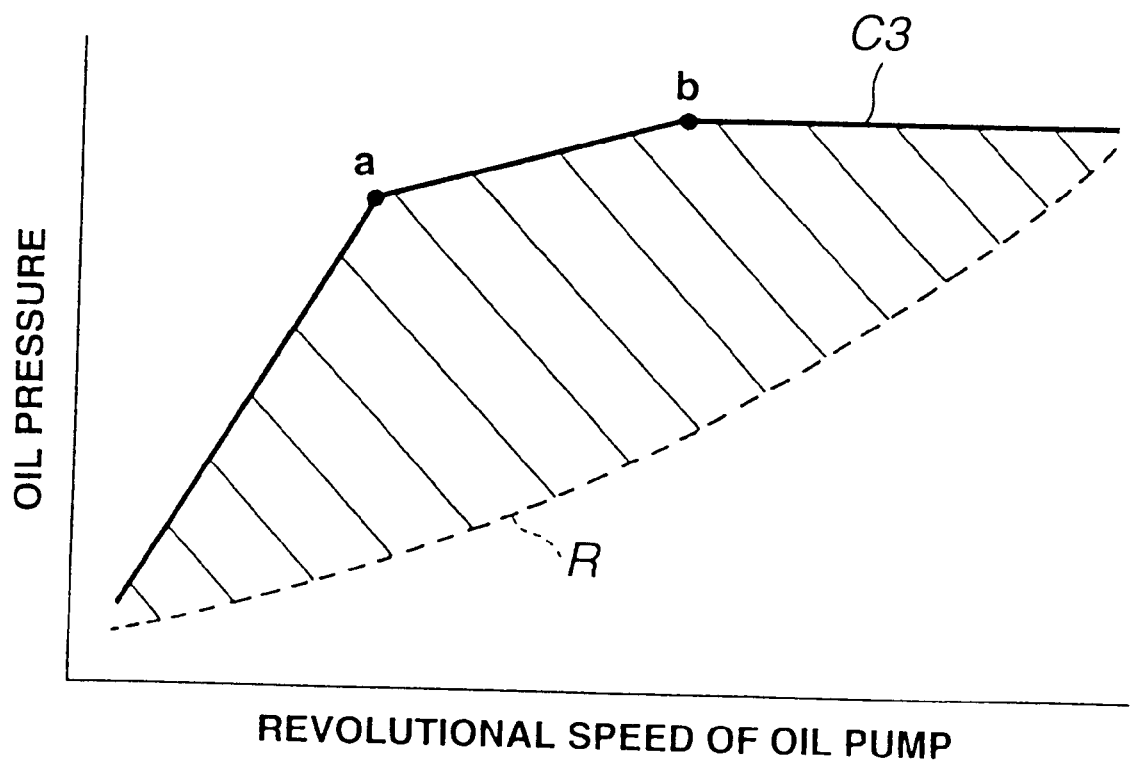
FIG. 10 is a graph similar to FIG. 4 but showing an oil pressure characteristics of an oil pump provided with a conventional pressure relief valve, in terms of oil pressure and revolutional speed of the oil pump.

FIGS. 7 to 9 illustrate a further embodiment of the pressure relief valve V according to the present invention, which is similar to the embodiment of FIGS. 1 to 4 with the exception that a narrow, elongate, slit-shaped pressure relief hole 20 is used in place of the first and second pressure relief holes 7, 8.

Specifically, the slit-shaped pressure relief hole 20 is formed elongate in the direction of movement of the valve body 11, so that the cross-sectional opening area of the pressure relief hole 20 linearly changes in the process of movement of the valve body 11. The cross-sectional opening area of the pressure relief hole 20 has a length (L) which is not less than 3 times of a width (W) of the same. The width (W) is not larger than 70% of the diameter of the valve body 11.

In the thus arranged pressure relief valve V, the valve body 11 slidingly move in the valve accommodating bore 3 along the wall W under balance between the pressure of oil and the biasing force of the pressure relief spring 13 thereby accomplishing an opening-and-closing control of the pressure relief hole 20. When the pressure relief hole 20 is opened upon movement of the valve body 11 in the valve accommodating bore 3, a part of oil discharged from the oil discharge chamber 5 of the oil pump P is released as an excessive oil through the pressure relief hole 20 toward the oil suction passage At this time, as the valve body moves in a direction far from the oil passage 6, the slit-shaped pressure relief hole 20 begins to be partially opened so that the cross-sectional opening area of the pressure relief hole 20 generally linearly increases. As a result, an oil pressure characteristics of the oil pump as indicated by a solid line C2 in FIG. 9 is obtained. In this oil pressure characteristics, at a point A in FIG. 9, the slit-shaped pressure relief hole 20 begins to be opened to slightly reduce the increasing rate of the oil pressure of oil discharged from the oil pump P. Then, as the discharge amount of oil from the oil pump P increases, the cross-sectional opening area of the pressure relief hole 20 is gradually increased, thus obtaining the oil pressure characteristics in which the oil pressure is gradually increased.

Thus, according to this embodiment, the oil pump P can provide the oil pressure characteristics similar to the required or ideal oil pressure characteristics for the engine as indicated by a dotted line R in FIG. 9, so that the engine and the oil pump can be prevented from being forced to make excessive work. Consequently, by virtue of the pressure relief valve V of the embodiment, the oil pressure characteristics of the oil pump P generally corresponding to the required oil pressure characteristics can be readily obtained.

Further, the pressure relief hole 20 has, in cross-section, the length (L) which is not less than 3 times of the width (W) of the same. This makes it possible to obtain such a certain cross-sectional opening area as to prevent oil pressure of the oil pump from excessively increasing. Furthermore, the width (W) of the pressure relief opening 20 is, in cross-section, not larger than 70% of the diameter of the valve body 11. This prevents the valve body 11 from entering the pressure relief hole 20 even when the valve body 11 inclines within the valve accommodating bore 3.

While the pressure relief valves of the embodiments have been shown and described as having one or two pressure relief holes, it will be appreciated that the pressure relief valve may have more than two pressure relief holes.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A pressure relief valve for an oil pump, comprising:
   a valve accommodating bore into which oil under pressure from the oil pump is supplied, said bore being formed with a plurality of pressure relief holes through which oil in said valve accommodating bore is dischargeable, said pressure relief holes being in communication with a low pressure side of the oil pump, the low pressure side being lower in oil pressure than an oil discharge chamber of the oil pump; and
   a valve body slidably movable in said valve accommodating bore under balance between oil pressure acting on said valve body in a first direction and a biasing force of a spring acting on said valve body in a second direction opposite to the first direction;
   wherein at least one of said pressure relief holes is maximally opened by movement of the valve body in the first direction, before remaining pressure relief holes are successively opened by further movement of said valve body in the first direction and further comprising:
      a guide and support section formed on an end of said valve body which end receives the oil pressure, said guide and support section having a communication hole which is communicable with at least one of the plurality of pressure relief holes to allow oil located upstream of said valve body to be releasable to the outside of said valve accommodating bore.

2. A pressure relief valve for an oil pump, comprising:
   a valve accommodating bore, said bore being formed with a plurality of pressure relief holes including first and second pressure relief holes through which oil supplied into said bore from the oil pump is dischargeable from said bore, said pressure relief holes being in communication with a low pressure side of the oil pump, the low pressure side being lower in oil pressure than an oil discharge chamber of the oil pump; and
   a valve body which controls the plurality of pressure relief holes and which is slidably movable in said bore under a balance between oil pressure from the oil pump acting on said valve body in a first direction and a biasing force of a spring acting on said valve body in a second direction opposite to the first direction;

wherein said second pressure relief hole is opened by movement of said valve body in the first direction after said first pressure relief hole is maximally opened by a predetermined first amount of movement of said valve body in the first direction and further comprising:

a guide and support section formed on an end of said valve body which end receives the oil pressure, said guide and support section having a communication hole which is communicable with at least one of the first and second relief holes to allow oil located upstream of said valve body to be releasable to the outside of said valve accommodating bore.

3. A pressure relief valve as claimed in claim 2, wherein said first and second pressure relief holds are arranged along the axis of said valve accommodating bore and separate from each other.

4. A pressure relief valve as claimed in claim 2, wherein said first pressure relief hole has a cross-sectional opening area smaller than that of said second pressure relief hole.

5. A pressure relief valve as claimed in claim 2, wherein said first and second pressure relief holes respectively have first and second cross-sectional areas wherein the first area is not smaller than the second area.

6. A pressure relief valve comprising:

a valve accommodating bore, said bore being formed with a plurality of pressure relief holes through which oil in said valve accommodating bore is dischargeable; and a valve body slidably movable in said valve accommodating bore under balance between oil pressure acting on said valve body in a first direction and a biasing force of a spring acting on said valve body in a second direction opposite to the first direction;

wherein the plurality of pressure relief holes are sequentially opened in accordance with the movement of said valve body in the first direction along an axis of said valve accommodating bore, and further comprising:

a guide and support section formed on an end of said valve body which end receives the oil pressure, said guide and support section having a communication hole which is communicable with at least one of the plurality of pressure relief holes so as to allow oil located upstream of said valve body to be releasable to the outside of said valve accommodating bore.

7. A pressure relief valve for an oil pump driven by an internal combustion engine, said pressure relief valve comprising:

a valve accommodating bore, said bore being formed with a plurality of pressure relief holes through which oil in said valve accommodating bore is dischargeable from said valve accommodating bore, said pressure relief holes being in communication with a low pressure side of the oil pump, the low pressure side being lower in oil pressure than an oil discharge chamber of the oil pump; and a valve body slidably movable in said valve accommodating bore under balance between oil pressure acting on said valve body in a first direction and biasing force of a spring acting on said valve body in a second direction opposite to the first direction;

wherein after at least one of said pressure relief holes is maximally opened in a low and medium engine speed operating range of the engine, before remaining pressure relief holes are successively opened in a process of movement of said valve body in the first direction along the axis of said valve accommodating bore; and further comprising:

a guide and support section formed on an end of said valve body which end receives the oil pressure, said guide and support section having a communication hole which is communicable with at least one of the plurality of pressure relief holes to allow oil located upstream of said valve body to be releasable to the outside of said valve accommodating bore.

8. A pressure relief valve as claimed in claim 1, wherein the low pressure side comprises an oil suction passage of the oil pump.

9. A pressure relief valve as claimed in claim 1, wherein said pressure relief holes are axially aligned with and separate from each other and formed along a common side of said valve accommodating bore.

10. A pressure relief valve as claimed in claim 9, wherein a wall, in which the valve accomodating bore is at least partially defined, is formed with a pressure passage which is axially aligned with said pressure relief holes and located on the same side of the valve accomodating bore as the pressure relief holes.

11. A pressure relief valve as claimed in claim 10, wherein said pressure relief holes and said pressure passage extend parallel with each other.

12. A pressure relief valve as claimed in claim 4, wherein said second relief hole has a generally rectangular cross-section.

13. A pressure relief valve for an oil pump driven by an internal combustion engine, comprising:

a valve bore into which oil under pressure from the oil pump is supplied, said valve being formed with a plurality of axially arranged pressure relief ports through which oil, supplied into said valve bore by the oil pump, is dischargeable, said pressure relief bores communicating with an induction passage of the oil pump; and a valve body for controlling the opening of the pressure relief ports, said valve body being reciprocatively disposed in said valve bore and movable under a balance between oil pressure acting on said valve body in a first direction and a biasing force of a spring acting on said valve body in a second direction opposite to the first direction;

wherein, only after at least one of said pressure relief ports is fully opened, are remaining pressure relief ports successively opened in accordance with movement of said valve body in the first direction and further comprising:

a guide and support section formed on an end of said valve body which end receives the oil pressure, said guide and support section having a communication hole which is communicable with at least one of said plurality of pressure relief ports to allow oil located upstream of said valve body to be releasable to the outside of said valve accommodating bore.

14. A method of operating a pressure relief valve for an oil pump driven by an internal combustion engine, the oil pump including:

a valve bore, said valve bore being formed with a plurality of axially arranged pressure relief ports through which oil, supplied into said valve bore by the oil pump, is dischargeable, said pressure relief ports communicating with a low pressure side of the oil pump wherein oil pressure is lower than oil pressure in an oil discharge chamber of the oil pump, a valve body slidably movable in said valve accommodating bore under balance between oil pressure acting on said valve body in a first direction and biasing force of a spring acting on said valve body in a second direction opposite to the first direction and a guide and support section formed on an end of said valve body which end receives the oil pressure, said guide and support section having a communication hole which is communicable with at least one of said pressure relief ports to allow oil located upstream of said valve body to be releasable to the outside of said valve accommodating bore;

said method comprising:
  displacing said valve body in a first direction along said valve accommodating bore; and
  successively opening said pressure relief ports so that at least one of said pressure relief ports is maximally open before another begins to open.

15. A pressure relief valve comprising:

a valve bore;

a valve body reciprocally disposed in said bore so as to be movable in first and second axial directions and to define a variable volume chamber into which oil under pressure is introduced from a pump, the pressure in the variable volume chamber producing a force which tends to move the valve body the first axial direction against a bias which tends to move the valve body in the second axial direction;

first and second drain ports formed in said valve bore, said first and second drain ports being arranged axially along a common side of the valve bore and so that a first amount of displacement of the valve body in the first axial direction maximally opens only the first drain port and a second and greater amount of axial displacement of the valve body in the first direction begins to open the second drain port, the first drain port having a cross sectional area which is less than that of the second drain port; and a guide and support section formed on an end of said valve body which end receives the oil pressure, said guide and support section having a communication hole which is communicable with at least one first and second pressure drain ports to allow oil located upstream of said valve body to be drained from said valve accommodating bore.

16. A pressure relief valve as claimed in claim 1, wherein said guide and support section is cylindrical.

17. A pressure relief valve as claimed in claim 16, wherein said guide and support section has a diameter which is the same as that of said valve body.

18. A pressure relief valve as claimed in claim 4, wherein said guide and support section is located so that said first pressure relief hole is able to be closed by said guide and support section.

19. A pressure relief valve as claimed in claim 18, wherein said guide and support section is located so that said second pressure relief hole is able to be closed by a cylindrical wall section of said valve body.

* * * * *